United States Patent [19]
Ernest et al.

[11] 3,913,198
[45] Oct. 21, 1975

[54] ALIGNMENT OF THE MAJOR HOUSINGS IN A WANKEL ROTARY ENGINE

[75] Inventors: Robert P. Ernest, Dearborn Heights; Daniel C. Ahrns, Westland; Thomas E. Crowley, Livonia; Edwin J. Ounsted, Dearborn, all of Mich.

[73] Assignee: Ford Motor Company, Dearborn, Mich.

[22] Filed: July 1, 1974

[21] Appl. No.: 484,902

[52] U.S. Cl. .............. 29/156.4 R; 29/433; 29/467; 29/DIG. 46
[51] Int. Cl.² .......................................... B23P 15/00
[58] Field of Search....... 29/156.4 R, 428, 467, 464, 29/DIG. 46, 433; 418/1; 123/8.07

[56] References Cited
UNITED STATES PATENTS

| | | | |
|---|---|---|---|
| 2,896,311 | 7/1959 | Stafford et al. | 29/DIG. 46 |
| 3,380,149 | 4/1968 | Holbrook | 29/464 |
| 3,400,692 | 9/1968 | Jones | 123/8.07 |
| 3,488,830 | 1/1970 | Miller | 29/464 |
| 3,760,478 | 9/1973 | Harlin | 29/156.4 R |
| 3,830,598 | 8/1974 | Ruf | 29/156.4 R |

Primary Examiner—C. W. Lanham
Assistant Examiner—Dan C. Crane
Attorney, Agent, or Firm—Joseph W. Malleck; Keith L. Zerschling

[57] ABSTRACT

A method, readily adapted to automation, for assembly of a rotary internal combustion engine is disclosed. Independent and self-contained housing units are prepared which eliminate the need for high compression and superior sealing between said housing units, each unit is free to move in a plane perpendicular to the eccentric shaft, and dowels between the units or certain subassemblies have been eliminated. An oil soluble adhesive is used to facilitate unitary handling and installation of apex seal assemblies and a unique apron or separator means is used to install a split center bearing which serves as a unique element of the engine assembly. During the final step of the method, high pressure air is injected into the oil gallery or oil lubrication passage system of the engine, while vibration is applied to the housing units, resulting in a perfectly mated and aligned engine; unique tie-bolts extending the length of the engine, are torqued to full level with the engine in such accurately aligned condition.

15 Claims, 19 Drawing Figures

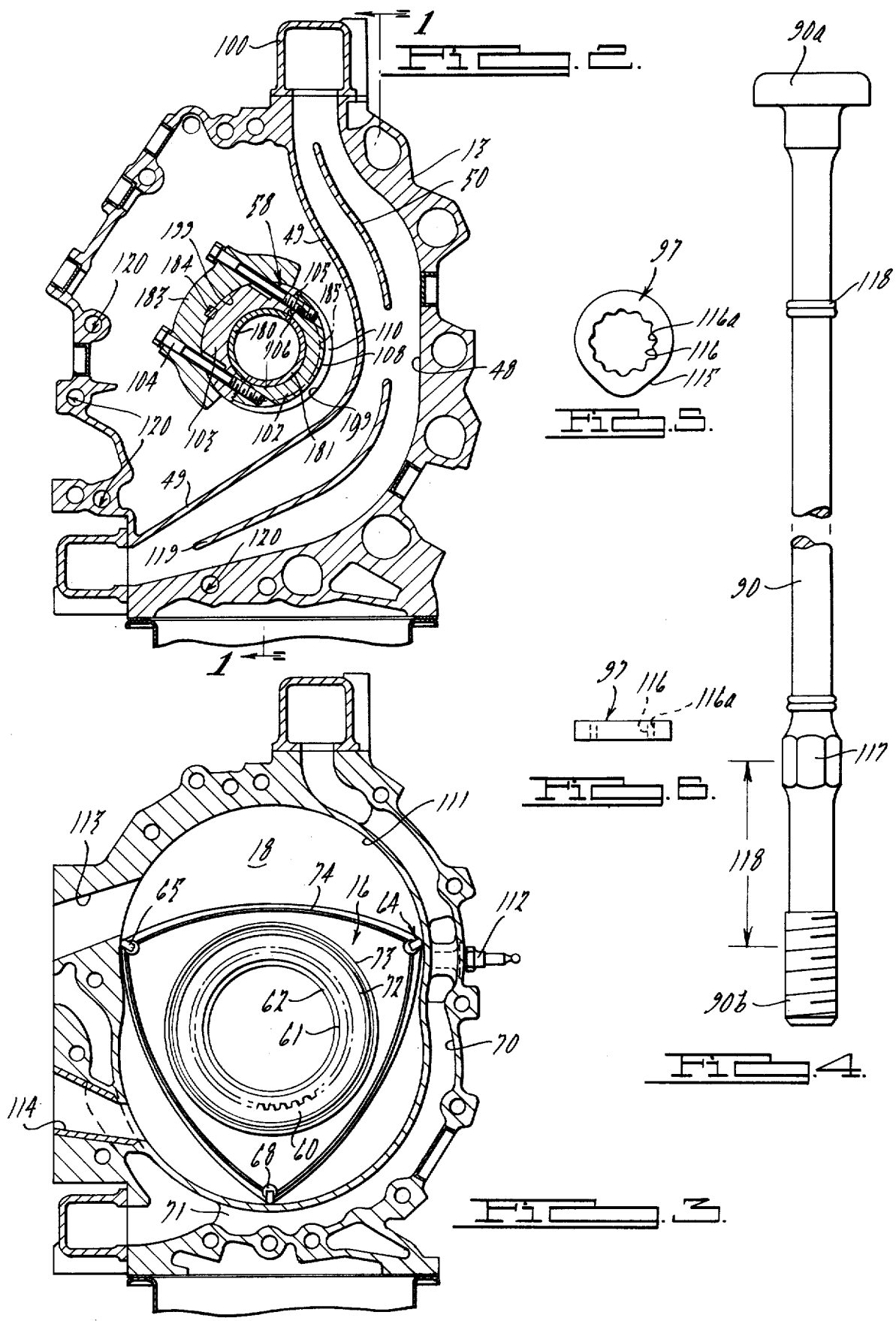

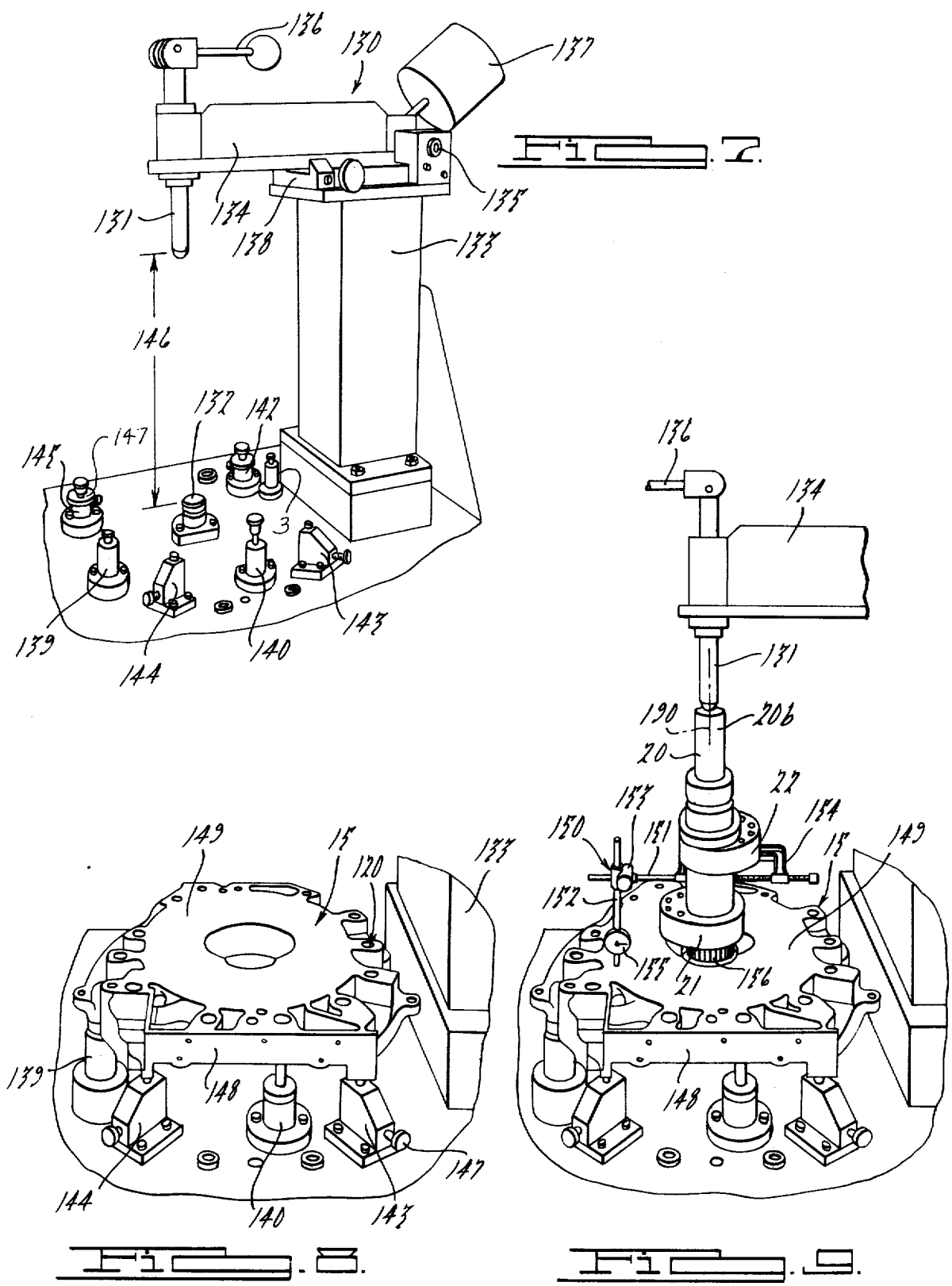

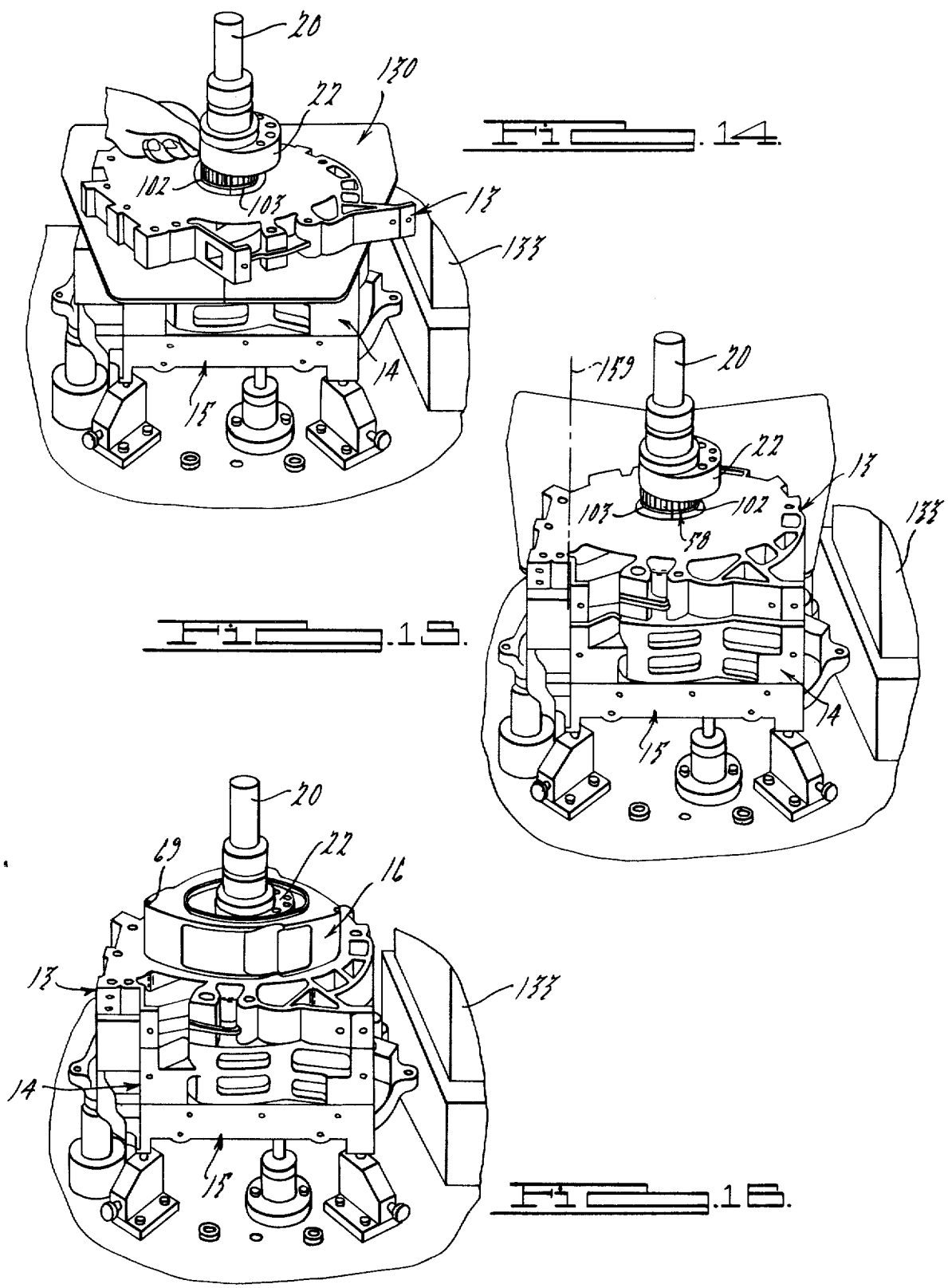

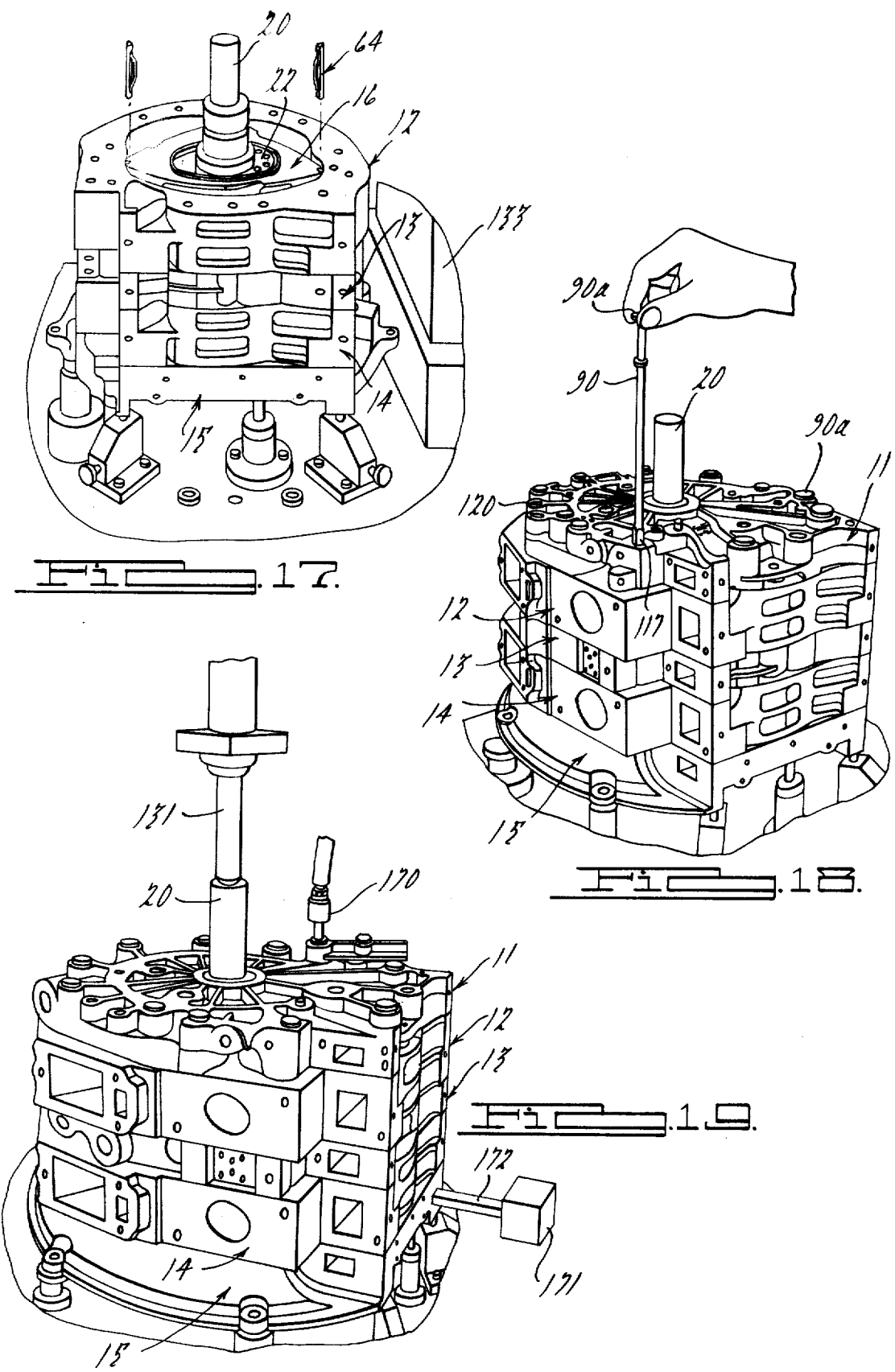

ALIGNMENT OF THE MAJOR HOUSINGS IN A WANKEL ROTARY ENGINE

BACKGROUND OF THE INVENTION

Commercially available rotary internal combustion engines typically have a cooling system which is of the axial flow type. That is, the cooling fluid passes parallel to the axis of the eccentric shaft through transverse openings arranged annularly in each housing unit. In a multiple rotor engine, the housing units would comprise front, intermediate, and rear side housing units and two separate rotor housings; the cooling fluid passes through each of these five housing units before return to the point of introduction. This imposes special requirements upon fluid sealing and compression members used to hold the housing elements together. A fluid tight engine has been obtained by the use of O-ring seals placed in grooves defined in the mating faces between such housing units, tie-bolts, in large numbers, have been utilized to compress the stack of housings together. In order to promote better compression, the tie-bolts have been located close to the inner trochoid wall which unfortunately interferes with cooling flow efficiency. The number of O-rings required in a two rotor engine may be as high as 31; several of these O-rings may be of considerable size. The number of tie-bolts eventually required in a commercial engine of this type may be no less than 16–20 and have an undue twistable length. During assembly of these bolts, torquing of the bolts to a specified load frequently results in extensive twisting of the bolt making it very difficult to maintain the proper torque by the assembler. Eventually, several of the engine on hot and cold cycling tests have failed in the O-ring seal area because of inadequate compression load from the bolts.

Alignment of the various housing elements, rotors and bearings as an assembled group has remained a significant time-consuming problem, one which has not been solved with a view toward total automation of the engine. Typically, the prior art has utilized dowels for locating all side housings with respect to the peripheral shells of the rotor housings; in some prior art approaches, the dowels have been defined as hollow sections through which the tie-bolts extend. Dowels are intended to provide an independent mechanical alignment feature for the eccentric shaft within the housing units. This does not necessarily lead to absolutely accurate alignment since tolerances between dowels multiply an error factor which prevents perfect alignment between the shaft, eccentrics, and rotors.

All of these attributes of axial flow cooling have hindered improved engine assembly techniques and has contributed to a more costly engine design. The prior art has not addressed itself to a variety of solutions to these problems, but rather, has attempted to re-arrange the location of the tie-bolts for purposes of enhancing thermodynamic heat transfer with little regard to assembly costs and sealing efficiency.

SUMMARY OF THE INVENTION

A primary object of this invention is to provide an improved rotary internal combustion engine which is designed to be assembled by techniques rendering significant cost savings and which can fundamentally follow a drop-together sequence. A particular feature of this principal object is the provision of self-contained housing units which reduce the requirement for compressive forces between housing units and which do not require inter-relating elements or members between separate housing units other than a reduced number of tie-bolts utilized to hold the stack of housing together.

Another object of this invention is to provide a unique method for eliminating the need to align housing units during assembly and provides for automatically aligning the various housings units and rotor elements of the engine with absolutely perfect tolerance at the time the tie-bolts are secured. A particular feature pursuant to this object is the use of high pressure air injection which is introduced through the oil passage areas serving to lubricate the annularly uniform spacing between the main bearings and various eccentric shaft journals. While the air pressure is applied, the units are vibrated and secured in the balanced position.

Another object is to provide a unique tie-bolt design which avoids twisting during torquing, by utilizing a tie-bolt design which has a non-torqued head, but incorporates a polygonal section adjacent the threaded end of the tie-bolt, said polygonal section adjacent the threaded end of the tie-bolt, said polygonal-shaped section being secured against twist by a complimentary shaped insert member in the housing.

Yet still another object of this invention is to provide a method for assembling rotary engine which can be accomplished totally by automatic equipment. Specific features pursuant to the above objects comprise the unique method technique whereby parts of an apex seal composite are retained together for quick insertion by an oil soluble adhesive, and in a multiple rotor engine a split main bearing is introduced by utilizing a removable split apron plate.

SUMMARY OF THE DRAWINGS

FIGS. 2 and 3 are sectional views taken respectively along lines 2—2 and 3—3 of FIG. 1;

FIG. 4 is an enlarged elevational view of a tie-bolt used in the assembly of the engine of FIG. 1;

FIG. 5 is a plan view of an insert received by the rear side housing of the engine of FIG. 1 and effective to cooperate in the torquing of the tie-bolt of FIG. 4.

FIG. 6 is an elevational view of the insert of FIG. 5; and

FIGS. 7–19 illustrate sequentially the inventive steps in the assembly of a rotary internal combustion engine of FIG. 1.

DETAILED DESCRIPTION

In its essential aspects, the new method herein for fabricating a rotary internal engine essentially comprises six steps:

a. Self-contained housing elements and rotor assemblies are prepared as distinct and independent units. The housing elements, particularly, are self-contained in that a cooling circuit passes solely through one element only in a predetermined manner; the circuits are connected in parallel exterior of the housing elements when the engine is fully assembled. Each of the housing elements have a plurality of bolt openings which align with each other when the housing elements are properly inter-related in the last step of the method.

b. An eccentric shaft is provided with at least one integral eccentric for each rotor assembly, the eccentric shaft having an oil passage system effective to conduct pressurized oil to various locations along said eccentric shaft for promoting a thin film between said housing elements, rotor assemblies and eccentric shaft during normal engine operation.

c. Next, a pedestal and at least one centering pin or cone are provided. The pin or cone is used to define a centering axis for temporarily aligning and stationing the disposition of the eccentric shaft. The pedestal has at least three points lying in a common plane to align the end side housing element, placed thereon, so as to be perpendicular to the axis of the eccentric shaft. The centering pin is adapted to permit the eccentric shaft to be inserted with one end into the central opening of said supported end side housing, the centerline of said eccentric shaft protruding in a direction normal to the machined side surface of the side housing element.

d. The remaining housing elements and rotor assemblies are impaled about said protruding eccentric shaft and lowered to rest in series upon the rear side housing supported by said pedestal; the elements and assemblies are arranged to define predetermined variable volume combustion chambers therebetween and are lightly secured together by insertion of tie-bolts through said bolt openings.

e. A supply of high pressure air is placed in communication with the oil passage system of said housing elements and crankshaft, as well as the rotor assemblies, to effect a biasing therebetween for providing a predetermined aligned position. The housing elements are vibrated while said supply of high pressure air is communicated to insure adjustment under the influence of high pressure air.

f. The tie-bolts are then tightly secured in place with the housing elements, rotor assemblies which are assured of proper alignment on said crankshaft.

Figure 1:
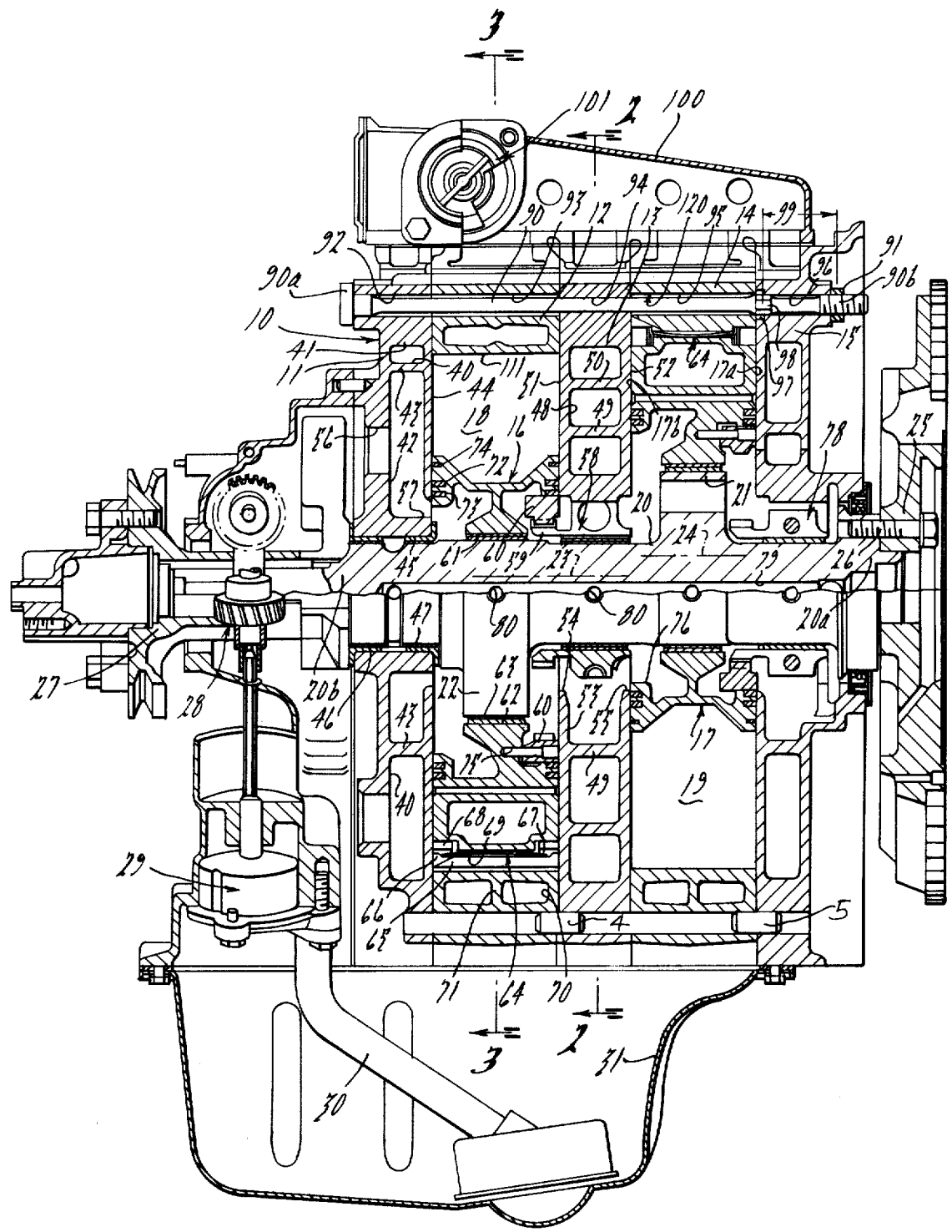
FIG. 1 is substantially a central sectional elevational view of a rotary internal combustion engine which incorporates the principles of this invention and has been assembled by the method herein.

Turning now in some particularity to the drawings and firstly to FIGS. 1–3, there is shown an engine 10 completely assembled according to this invention. The major components of the engine comprise housing elements 11–15, rotor assemblies 16 and 17, an eccentric shaft assembly having an eccentric shaft 20 and split gear and bearing assemblies 58 and 78, a water cooling system having an independent circuit in each of the housings, and an oil lubricating system which extends through the eccentric shaft assembly, each of the side housings and rotor assemblies. The housing elements define epitrochoid spaces 18 and 19; the rotor assemblies further cooperate to define variable volume combustion chambers in the spaces 18 and 19.

A water cooling circuit for the front side housing shall be described and is typical for the type of circuits in the remaining side housing elements. The front side housing element 11 has a water cooling channel 40 which extends arcuately about a segment of the circumference of the housing. Channel 40 is defined on its inner periphery by a web 43 separating an oil cooled chamber and is defined on its outer periphery by wall 41. Flow channel 40 is fed with cooling water from a common manifold at the underside of the engine (not shown) and the flow exits at an upper portion into a manifold 100 having a temperature sensitive means 101 for controlling a bypass system which is effective to continue circulation of water cooling independent of the radiator (not shown) to maintain a predetermined higher cooling system temperature. The front side housing 11 has a circular central opening 45 (co-axial with eccentric shaft centerline 23) for receiving a unitary bearing sleeve assembly (46, 47) and eccentric shaft 20. A rearwardly facing machined side surface 44 cooperates in defining said trochoid chamber 18.

Turning now to other housing elements, the front rotor housing 12 has a slightly different water cooling circuit; it extends radially outwardly of the trochoid periphery or surface 111 of chamber 18. The flow circuit 70, passes along and about some of the bolt bosses which receive the tie-bolts 90. A flow foil or supporting rib 71 divides certain portions of the flow channel 70. No part of the oil lubricating system resides in the rotor housings.

The intermediate side housing 13 has machined side surfaces 51 and 52 which respectively cooperate in defining the trochoid chambers 18 and 19. A water cooling channel 48 is defined therein which extends arcuately along substantially the same arcuate distances as for the front side housing element 11. A flow foil 50 is employed for controlling the flow therein and the radially inner portion of the flow channel is defined by a wall 49 also serving to separate the oil channel. Rear side housing element 15 is similar in construction to front side housing element 11, rear rotor housing element 14 is similar in construction to front rotor housing element 12.

Each of the rotor assemblies 16 and 17 have an apex seal assembly 64 stationed at each of the three apices of the rotor. The assembly 64 comprises a two-piece apex seal having a substantially elongated piece 65 extending across the entire width of a trochoid chamber and another piece 66 which facilitates lateral adjustment. The assembly is received in a slot 69 in the rotor and is biased radially outwardly by a spring 67. Corner seals 68 and annular sealing rings 74 cooperate with the apex seal to form a sealing grid. Each of the rotors carry a pair of oil seal rings 72 and 73 on each side thereof for engaging the side surfaces such as 44 and 51.

The eccentric shaft 20 extends through each of the housing elements and has two eccentric portions 21 and 22 effective to mate with bearing openings in each of the rotor assemblies. The centerline 24 of the eccentric portion 21 is shown; a similar centerline for eccentric portion 22 would be offset similarly but on the opposite side of the shaft. The front end of the eccentric shaft 28 carries appropriate power takeoff means, such as that at 28 for driving an oil pump at 29; a member 27 is useful for driving a fan for the cooling system of the engine. The rear portion 20a of the crankshaft carries a flywheel 25 secured by fasteners 26.

Split gear and bearing assemblies 58 and 78 are employed within the intermediate housing element 13 and the rear side housing 15. Center bearings 58 is particularly important because it notably resists deflection of the eccentric shaft. Each assembly (see FIG. 2 particularly) comprises split portions 102 and 103 or yokes which mate at a serrated parting line 105. The gearing is not shown as it resides beneath the plane of the yokes 102 and 103 as evident from FIG. 1. Split bearing portions 180 and 181 constitute split tin-aluminum fittings inside the yokes and having a parting line coincident with line 105. Suitable cap screws or bolts 104 extend through each of the portions 102 and 103 and through an arcuate portion 183 of the intermediate housing element 13, for purposes of securing them together. The central inner surface 199 of the intermediate housing and the outer surface of portion 103 have a keyway extending axially; a key 184 fits into the aligned keyways to lock the assembly 58 to the housing.

To fit portions 102 and 103, along with split bearing onto the eccentric shaft 20, requires a special construction. This is facilitated not only with the key 184 and mating keyways, but the secondary portion 102 is made slightly smaller in radius than annular surface 109, leaving a space 110, but also a groove 185 is machined at the edge 108 to fit under a complimentary lip (not shown) on the intermediate housing. Thus, the primary portion 103 is firstly inserted by itself in the space to be occupied by the secondary portion 102, housing 13 is moved relative to the eccentric shaft 20 to have groove 185 underlie and align with the housing lip 109. Portion 102 is then inserted into space to be occupied by 103 and the assembly 58 is rotated 180° and locked to portion 183 of the housing 13 both by the key 184 and chordally directed bolts 104.

Gear portion 60 is carried by the rotor assembly for meshing with gear portion 59 integrally formed as part of assembly 58; together they provide accurate timing between the rotors and eccentric shaft. Fasteners 75 are employed to secure the gear ring 60 to the rotor assembly. A similar assembly is employed in the rear side housing element 15 and the description is similar to assembly 58. The latter assembly is split to allow for a flanged eccentric shaft and is even easier to assemble than assembly 58.

The series of housing elements are secured together in a stacked series about the eccentric shaft by a plurality of tiebolts 90 (see FIGS. 4-6), each of a length sufficient to extend from the most forward dimension of the front housings to the rearward dimension of the rear side housings. Each of the tiebolts have an untorqueable head 90a and a thread portion 90b. A suitable nut 91 is threaded upon the threaded portion 90b for torquing the bolt to a sufficient compressive force for securing the housing elements together. The considerably long tie-bolts extend through aligned openings 92-96 respectively in each of the housing elements 11-15. Each of the tie-bolts have a polygonal-shaped surface 117 located relatively close to the threaded portion 90b (see FIG. 4), a distance preferably equal to the transverse width of housing element 15. The polygonal-shaped surfaces 117 are griped by an insert 97 which has a corrugated central opening 116 or a configuration complimentary to the shape of the polygonal-shaped surfaces 117. The insert 97 has an irregular shaped outer side surface 115 (pear-shaped received by a complimentary-shaped irregular surface in the rear side housing element 15 so as to be locked against rotation about the axis of the tie-bolt. The closely related surfaces 117 and threaded portion 90b can be conveniently forged and the rod stock welded thereto (such as at 118) resulting in a considerable reduction in the cost of making tie-bolts.

Accordingly, when a tie-bolt is inserted through the aligned openings 92-96, the polygonal surfaces 117 will be engaged by the interior of insert 97 and be restrained against rotary movement. The distance 118 between the polygonal-shaped surfaces 117 and a threaded portion 90b, insures that during torquing of the nut 91, severe twisting will not occur in the shank of the tie-bolt 90.

The oil lubricating system principally has a central passage 79 extending through the interior of the eccentric shaft which feeds a plurality of radiating passages 80 extending outwardly to the bearings for each of the side housings and eccentrics. Radial ports are also provided (not shown) to introduce oil to the flinger opening into the interior of the rotors, such as at 73. Oil from the bearings of the front and rear side housings migrate toward the nearest rotor where the oil may join with the slinger oil. Oil circulates from each of the rotors to the intermediate housing element 13 such as at 54 or 55 to a drain (not shown) for return to the pump 29. Suitable drain passages of chamber 53 lead to the sump 31 where it is again drawn upwardly by a tube 30 connecting with the oil pump 29 for recirculation throughout the oil passage system. Oil is thus constantly introduced to the outer surface of the eccentrics and the bearing members thereon, and to the bearings journaled in the side housing elements. A predetermined dimensional tolerance is built into the spacing therebetween which inherently provides for an oil film of extremely accurate tolerance. It is this predetermined thin film spacing that is utilized by this invention during the method of assembly to assure proper alignment of the side housing elements about the eccentric shaft main bearings prior to actual introduction of oil into the various chambers and passages.

Turning now to the series of drawings (FIGS. 7-19) the steps of the above method is depicted. In FIG. 7, an adjustable centering pin fixture 130 is provided which carries opposed centering pins 131 and 132 to define a centering axis for the eccentric shaft. The base centering pin 132 is fixed and has an accurately machined conical nose effective to fit concentrically within an opening in the crankshaft 20. The upper centering pin 131 is carried by arm 134 supported on upright 133 adjustable by way of elevating means 136 and horizontal adjustment means 138. The arm counter weighted at 137 for ease of pivotal movement about 135 for insertion of the workpiece. The distance 146 can thus be adjusted. The pedestal comprises a plurality of adjustable supports 145, 142 and a fixed support 140; dowel supports 139 and 3 are effective to loosely engage predetermined openings or locations in the exterior surface of the rear front housing. Two of the supports 142 and 145 are adjustable vertically with vernier means 147.

In FIG. 8, the rear side housing 15, which has been previously prepared with structural features required by the first step of the method, is placed on the pedestal and surface 149 is adjusted to lay horizontal. One point or surface contour 148 on the periphery of the side housing is selected as a reference point for alignment.

In FIG. 9, the eccentric shaft 20, having the integrally formed eccentrics 21 and 22 thereon (with split gear assembly 78 in place around the rear journal), is inserted with its rear end 20a through the central opening in the rear side housing 15 and engaged with the base centering pin 132. The key 184 in split gear 78 is engaged in slot in portion 183 of rear housing; the opposite end 20b of the eccentric shaft is secured by engagement of centering pin 131 and completes a centering or trunnion axis 190.

The disposition of the centerline of the eccentric shaft, now coincident with centering axis 190, is aligned normal or perpendicular to the machined surface 149 of the rear side housing 15 by use of a dial gauge assembly 150. The gauge and arm 151 are clamped to the eccentric shaft 20 by means 154. The dial gauge 155 is rotated about the outer margin of the finished surface 149 and any deviation on the dial guage is noted so that vernier adjustments 147 on supports 145 and 142 may be adjusted accordingly. After adjustment, spring loaded supports 143 and 144 are locked in place to provide additional support for rear housing 15. A portion of the gear on a split rear bearing 156 appears; the bearing is installed in split portions due to the size of a coupling flange on the end of the eccentric shaft.

Figure 10:
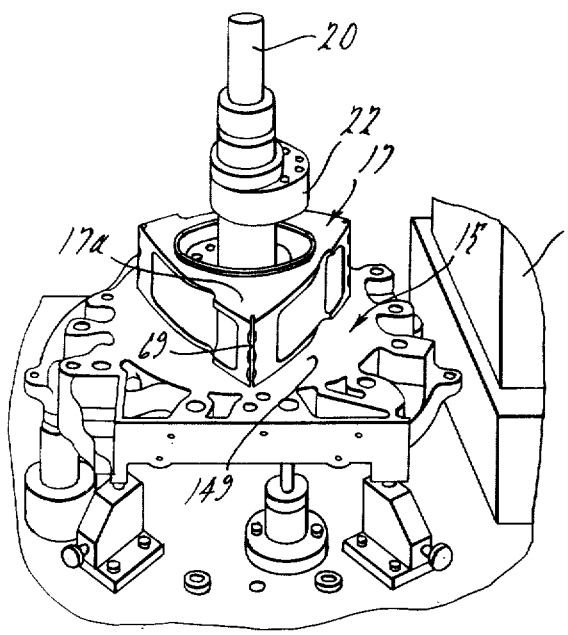

In FIG. 10, the rear rotor assembly 17, which has been previously fabricated with appropriate structure, is impaled onto the eccentric shaft 20 with one side thereof resting loosely upon the machined surface 149 of the rear side housing 15. Although the rotor is flush against the surface 149, the alignment parallel to the eccentric shaft is unimportant and the rotor is free to move in this one respect. The rotor is slipped about eccentric 21; the rotor has slots 69 for receiving the apex seal assembly in a later step.

Figure 11:
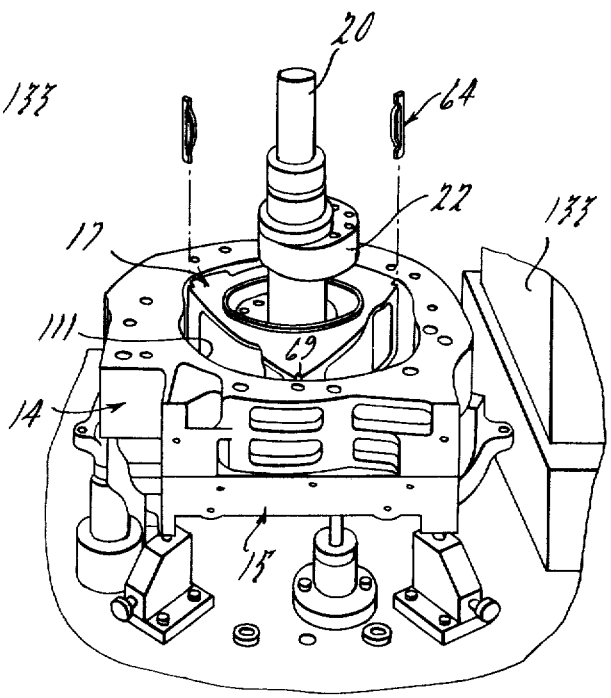

FIG. 11 shows the rear rotor housing 14 placed about the rear rotor assembly 17. Dowels 5 in the rear housing element 15 assure circumferential alignment of the rear rotor housing therewith (see FIG. 1). As shown in an exploded condition, the apex seal assemblies 64 are each inserted as a unit into the respective slots 69 defined in the apices of the rotor. To facilitate this technique, an oil soluble adhesive is applied liberally to the elements of the assembly (spring 67, pieces 65, 66), the corner seals 68 and side seals 74 having been previously installed on the rotor. The elements of the assembly are thereby adhered temporarily together to form a unit. Either by contact with the engine oil or when the engine attains operating conditions, oil will engage the assembly and dissolve the adhesive thereby permitting assembly 69 to function as designed. A typical oil soluble adhesive that may be utilized for this purpose is either reclaimed natural rubber base or styrene butadiene rubber, in an aliphatic solvent.

Figure 12:
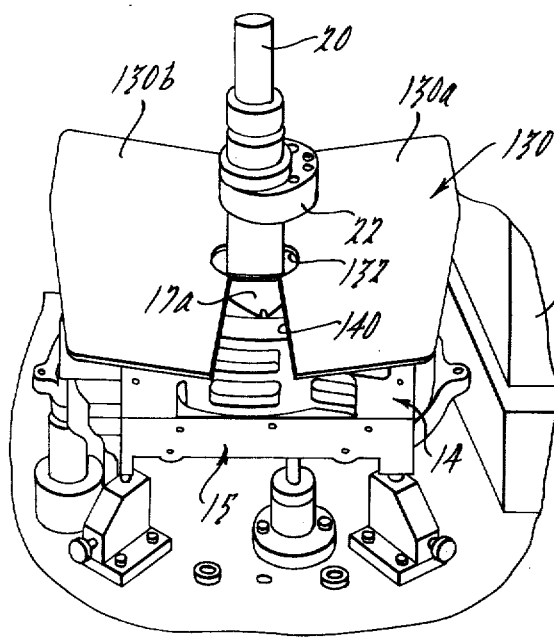

As shown in FIG. 12, a splitable separator means or apron 130 is stationed over the exposed side surface of the rear rotor assembly 17 and rear rotor housing 14. The splitable apron 130 has a central opening 132 to accommodate snugly the outer circumference of eccentric shaft 20 at a plane passing through the eccentric shaft where the apron will be positioned. The thin sheet metal apron 130 has leaves 130a and 130b pivotal about a point (hidden in FIG. 12) to meet in a closed position along line 140, and provides for: (a) protection of the finished machined surfaces of the rear rotor housing element 14, the intermediate housing element 13 to be superimposed and the side seals of the rear rotor assembly, and (b) acts as an assembly support for the split center bearing 58 which must fit within certain openings of the intermediate housing element. The apron may utilize a spring loaded clasp (not shown) for securing the closed position.

Figure 13:
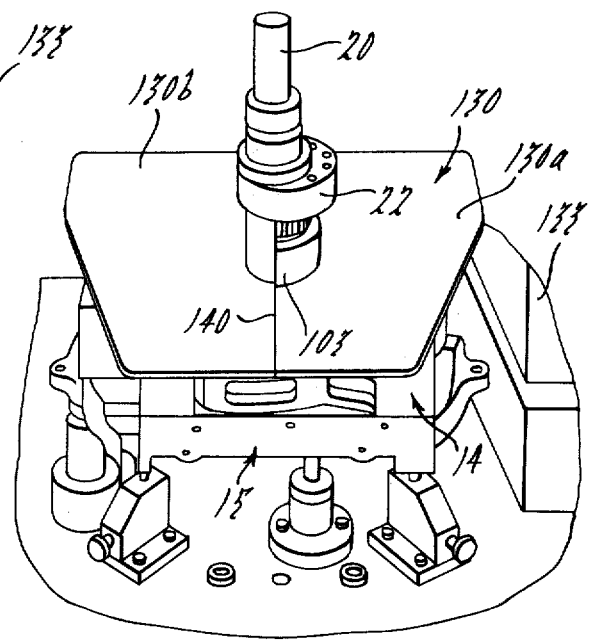

In FIG. 13, the apron 130 is shown fully closed about the eccentric shaft; the first portion 103 of the split center bearing 58 is stationed on the apron, about the eccentric shaft and in a position to have recess 110 in axial alignment with keyway 184 when the intermediate housing element 13 is lowered thereon.

In FIG. 14, the intermediate side housing element 13 is impaled onto the eccentric shaft to rest on apron 130 and has its central opening encircling the primary portion 103 of the split center bearing. The housing 13 is then moved laterally such that surface 109 is in contact with undercut 185 on the primary portion 103 of the split bearing. The other portion 102 of the split center bearing is inserted into the remaining part of the opening within element 13. This is shown as being done manually, but all of the operations of this assembly technique can be automated using straight line machine motions. When the two crescents or sections of the split bearing are in mating relationship within the opening, they are secured together and rotated about 180° so as to bring key 184 into locking relation with keyway on portion 183 of intermediate housing 13. Fasteners 104, joining the portions, extend in a chordal direction with respect to the circumference of the bearing (see FIG. 2). The intermediate housing elements, being free to move in a plane perpendicular to the eccentric shaft, can be shifted to generally align with a reference point or line 159 on the rear rotor housing and rear side housing elements (see FIG. 15).

FIG. 16 illustrates the front rotor assembly 16 impaled about the eccentric 22 and eccentric shaft 20 after the apron 130 has been removed by swinging the leaves 130a and 130b apart.

FIG. 17 shows the front rotor housing element 12 placed about the rotor assembly 16. Dowels 4 in the intermediate housing, assure circumferential alignment of the front rotor housing therewith. Other means than dowels may be used at this location, such as V-notch in the exterior of the housings which are aligned by a tool inserted thereinto. Apex seal assemblies 64 are again inserted in respective slots 69 of the rotor. an oil soluble adhesive is used to temporarily bind the elements of assembly 64 together.

In FIG. 18, the front side housing is placed on top of the front rotor housing 12 and the uniquely designed tie-bolts 90, of this invention, are loosely inserted through the aligned openings 92–96 of the various housing elements and all of the nuts are put on and hand started. A lesser number of tie-bolts is used than the prior art.

In the last step of the method, as shown in FIG. 19, the top centering pin 131 is brought downwardly into the aligned position to again stabilize the eccentric shaft 20. A pneumatic hose is coupled at 170 to the entrance for the oil lubrication passage system or oil gallery. Simultaneously, a vibrator mechanism 171 is connected at 172 to housing element such as rear side housing element 15 which happens to be the bottom of the stack series of housing units. While vibration is applied and high pressure air is injected, the housings are manually rotated to be made co-linear along 159. Four of the series of 10–12 tie-bolts 90 are torqued to a tightly torqued level. With these four tie-bolts secured, the engine is fundamentally fastened and the centering pins 131 and 132 can be removed and the remainder of the tie-bolts can be torqued to full level, such as spring condition of material. This is relatively low compression force since aluminum housing must be able to distort at 355°F. The air floats the parts as an aerostatic bearing and the vibration assures the air entrance to all spaces. The bearing tolerances are about .0015 inches.

The tie-bolt assembly utilized in connection with the method of this invention has certain novel features. As shown in FIG. 4–6, the tie-bolt 90 has a compression head at one end 90a and a threaded portion 90b at the opposite end; the compression head is adapted not to be torqued. A polygonal-shaped section 117 is provided, remote from the compression head, but somewhat adjacent the threaded portion 90b, separated by a distance 118 which should not be greater than one-fifth the bolt length (about 2 inches here). An insert 97 having an internal opening 116 defined with corrugation 116a to snugly receive the polygonal-shaped section 117 of the tie-bolt, is provided. The insert 97 has an irregular outer surface 115 (such as pear-shaped) to be received by similarly shaped irregular opening in the rear housing element 15. Accordingly, when the tie-bolts are inserted through the series of aligned openings 92–96 in the housing units, the polygonal-shaped section 117 will align and mesh with the corrugations of insert 97 and be restrained against twisting or rotary movement about its own axis since the insert is held fixed. The location at which this restraint is applied is relatively close to the threaded portion on to which a nut is secured and torqued. This eliminates the undersirable characteristics that the prior art has experienced where one end of the bolt is held while the opposite end torqued, resulting in severe twisting over the considerable length of the bolt. Inadequate compression forces were the typical result of the prior art.

We claim:

1. A method of fabricating a rotary internal combustion engine, comprising:
   a. preparing self-contained housing elements and at least one rotor assembly for said engine,
   b. providing an eccentric shaft with at least one eccentric thereon, said eccentric shaft having an oil passage system effective to conduct pressurized oil to maintain a predetermined concentricity between said crankshaft, housings and rotor during engine operation,
   c. providing at least one centering member for securing said crankshaft in one fixed position and provide a pedestal having at least three points lying in a common plane perpendicular to the axis of said crankshaft,
   d. impaling said housing elements and at least said one rotor assembly about said eccentric shaft and onto said pedestal in proper stacked order to define one or more predetermined engine chambers,
   e. introducing a supply of high pressure air into said oil passage system for biasing adjacent surfaces on said eccentric shaft, housing and rotor into a predetermined aligned position about said eccentric shaft, and
   f. securing said housing elements and rotor assembly in said biased position by employing means effective to exert a compression force to said stacked elements.

2. The method as in claim 1, in which vibration is applied to at least one of said housing elements during step (e) while said high pressure air is introduced to said oil passage system.

3. The method as in claim 1, in which during step (d) certain of said housing elements are interlocked together against rotary movement about said eccentric shaft by the use of dowels to constitute subassemblies, said subassemblies being free to move relative to each other about said eccentric shaft.

4. The method as in claim 1, in which in step (a) said housing elements are prepared with a plurality of bolt openings arranged for alignment along the axis of the engine, during step (d) said compression means is inserted to extend through said openings just prior to said introduction of air, the openings being free to be non-aligned prior to said latter step.

5. The method as in claim 4, in which in step (a) said housing elements have a polygonal-shaped surface co-axial with each of said aligned openings, and in step (f) said compression means comprises a plurality of tie-bolts extending through said aligned openings in said housing elements parallel to said eccentric shaft, each tie-bolt being characterized by an untorqueable head at one end and a torqueable threaded fastener at the opposite end, each bolt having a polygonal-shaped section complimentary to said polygonal-shaped surface and being proximate to the threaded portion of said tie-bolt so as to be fixed against movement about the axis of each bolt by engagement with said polygonal surface in the housing unit.

6. The method as in claim 5, in which in step (a) said housing elements are prepared so that in step (f) the distance between said polygonal-shaped section and said threaded fastener is no greater than one-fifth the length of each bolt whereby twisting forces about the axis of each bolt are substantially reduced during step (f).

7. The method as in claim 5, in which during step (f) a metallic insert is employed carring said polygonal defined surface for receiving the polygonal-shaped section of said bolt, said insert having an irregular outer configuration received in a complimentary shaped irregular receptacle in said housing unit adjacent said threaded fastener.

8. The method as in claim 1, in which during either step (a) or (b), the method further comprises preparing a bearing and timing means adapted to be used between and span at least one side housing element and at least one rotor housing element, and preparing and inserting dowel means into said one rotor housing element for interrelating said one side housing element and said one rotor housing element during step (d) and (e) to prevent movement about the axis of said eccentric shaft.

9. The method as in claim 1, for use in assembling a plural rotor engine wherein the elements and rotor assemblies are impaled in stages during step (d), the first impaling stage embracing placement of firstly a rear side housing, then a rear rotor housing and an intermediate housing upon said pedestal in a stacked sequence, the first rotor assembly being disposed in the interior of the rear rotor housing, the second impaling stage being preceded by the employment of separator means layed upon said intermediate housing having an inner periphery conforming to the eccentric shaft, said separator means having relatively movable leaves commonly pivoted in the plane of said leaves for permitting the inner periphery to be closed about the eccentric shaft and opened in a reverse manner when the second rotor housing and front side housing have been stacked, said separator means serving to support auxiliary elements to be assembled within the rotor assembly or housing unit and to protect the surface finish of said elements during assembly.

10. The method as in claim 9, in which during step (d) said impaling is carried out with the assistance of auxiliary elements having a split center bearing with crescent-shaped portions installed in sequence.

11. The method as in claim 1, in which during step (a) each of the housing elements is prepared with an independent water cooling circuit for traversing only one housing element, certain of said elements being related together in subassemblies which have dowels preventing relative movement therebetween, the sides of each of said subassemblies being devoid of protrusions whereby upon being impaled during step (d) in said stacked manner said subassemblies are free to move in a plane perpendicular to the eccentric shaft, said method further comprising application of vibration to at least one housing element during step (e).

12. The method as in claim 9, in which during step (d) split center bearing is inserted as an auxiliary element onto said separator means, a first portion of said bearing being provided with a recess along one edge thereof which is crescent shaped, the intermediate housing having a keyway effective to mesh with said recess of said first portion when said second portion is inserted and rotated 180° after being impaled in the plane of said intermediate housing, the second portion of said bearing being inserted after said first portion and the combination together being rotated said 180° to engage said keyway, said portions being secured together by suitable fasteners extending in a chordal direction with respect to the axis of said potions.

13. The method as in claim 1, in which during step (d) apex seal assemblies are inserted into the slots of said rotor assemblies immediately after each of the rotors are impaled in the sequence, said apex seal assembly being particularly characterized by the use of an oil or temperature soluble adhesive to temporarily retain parts of said apex seal assembly in an operative attached relation so as to be inserted as a single unit.

14. The method as in claim 3, in which during step (f) said tie-bolt is effectively torqued to a total clamping force effective to keep housing elements from slipping during operation solely by interface friction.

15. The method as in claim 11, in which during step (f) the clamping force is no greater than 65 pounds for each tie-bolt and the tie-bolts are limited in number to no greater than 12.

* * * * *